(12) United States Patent
Dupuis et al.

(10) Patent No.: US 11,929,790 B2
(45) Date of Patent: Mar. 12, 2024

(54) SYSTEM AND RELATED METHOD TO DIAGNOSE NOISE AFFECTING IMPAIRMENTS USING DEEP LEARNING

(71) Applicant: Nokia Solutions and Networks Oy, Espoo (FI)

(72) Inventors: Nicolas Dupuis, Antwerp (BE); Axel Van Damme, Antwerp (BE)

(73) Assignee: Nokia Solutions and Networks Oy, Espoo (FI)

( * ) Notice: Subject to any disclaimer, the term of this patent is extended or adjusted under 35 U.S.C. 154(b) by 236 days.

(21) Appl. No.: 17/222,180

(22) Filed: Apr. 5, 2021

(65) Prior Publication Data
US 2021/0320689 A1    Oct. 14, 2021

(30) Foreign Application Priority Data
Apr. 10, 2020   (EP) ..................... 20169194

(51) Int. Cl.
*H04B 3/32* (2006.01)
*H04B 3/487* (2015.01)
*H04B 17/345* (2015.01)

(52) U.S. Cl.
CPC .............. *H04B 3/32* (2013.01); *H04B 3/487* (2015.01); *H04B 17/345* (2015.01)

(58) Field of Classification Search
CPC ...................................................... H04B 3/32
See application file for complete search history.

(56) References Cited

U.S. PATENT DOCUMENTS

| | | | | |
|---|---|---|---|---|
| 2007/0036339 A1* | 2/2007 | Cioffi | ................... | H04M 3/304 379/399.01 |
| 2014/0105262 A1* | 4/2014 | Alloin | ..................... | H04B 3/46 375/222 |
| 2019/0260483 A1* | 8/2019 | Dupuis | .................. | H04L 43/08 |
| 2020/0274789 A1* | 8/2020 | Lyon | ....................... | H04L 43/50 |
| 2021/0320689 A1* | 10/2021 | Dupuis | ............... | H04B 17/345 |
| 2023/0013462 A1* | 1/2023 | Woldahl | ................. | H04L 43/10 |

OTHER PUBLICATIONS

European Office Action dated Sep. 28, 2023 issued in corresponding European Appln. No. 20169194.6.

* cited by examiner

*Primary Examiner* — Guang W Li
(74) *Attorney, Agent, or Firm* — Harness, Dickey & Pierce, P.L.C.

(57) ABSTRACT

A system for diagnosing noise impacting impairments affecting a Digital Subscriber Line includes at least one processor and at least one memory storing instructions. The at least one memory and the instructions configured to, with the at least one processor, cause the system at least to, receive noise sequences for said Digital Subscriber Line; detect noise symptoms in said noise sequences and identify noise impacting impairments associated with said noise symptoms using a trained machine learning model; and determine an impact on said Digital Subscriber Line of a plurality of noise impacting impairments.

14 Claims, 3 Drawing Sheets

SYSTEM AND RELATED METHOD TO DIAGNOSE NOISE AFFECTING IMPAIRMENTS USING DEEP LEARNING

CROSS-REFERENCE TO RELATED APPLICATIONS

The present application claims priority under 35 U.S.C. § 119 to European Patent Application No. 20169194.6, filed on Apr. 10, 2020, in the European Patent Office, the entire contents of each of which are hereby incorporated by reference.

TECHNICAL FIELD

Various example embodiments relate to the field of telecommunication. In particular, embodiments of the invention relate to a method and system for diagnosing impairments affecting a transmission medium such as a communication line.

BACKGROUND

With increasing bitrate offers, the deployment of Internet Protocol television solutions, Video-On-Demand and Tripleplay services, both system performance and customer support of communication networks become more and more exigent, particularly on Digital Subscriber Lines or DSLs. This physical link, which transports the information through wire lines up to the end user, is indeed known for being the bottleneck for the Quality of Service of the transmission system.

Recent technological evolutions additionally tend to push the signal bandwidth of the DSL lines higher and higher. While several years ago, traditional ADSL technology was using frequencies up to 1.1 MHz, the current VDSL2 technology can be applied up to 17 or even 35 MHz. The extensive use of those higher frequencies as well as of the upcoming of advanced solutions to increase the performance of the communication networks make the DSL link more sensitive to disturbances.

The performance of communication lines, for example used with DSL technology, is a key factor for a network operator. It is of prime importance to be able to remotely diagnose sources of physical problems and take actions to improve their performance. This helps the operators gaining in service quality as well as saving money and time by not involving human interventions for all types of issues.

Diagnosing line impairments remains challenging because:
  subscribers to the network expect a high accuracy, as a wrong diagnosis usually leads to cost increase, time inefficiency and bad perception from the subscribers;
  reliable diagnosis must be offered for a large coverage of any issues affecting the line.

SUMMARY

State-of-the-art Deep Learning solutions currently provide a diagnosis method to detect and recognize impairments affecting a transmission medium such as a DSL from its channel frequency response with a very high accuracy and precision.

However, even if proposing an accurate diagnosis of a transmission medium from its channel frequency response is important, it is usually not enough for accurately diagnosing line impairments. Network operators look for suitable recommendations, i.e. for insights on the most appropriate actions to take in order to restore the end-user's experience as well as a on the ability to completely characterize the PHY-layer. As such, diagnosing only the transmission medium from its channel frequency response is not enough, as problems also come from the surrounding environment and therefore impacting the communication.

In the presence of impairments, either the received signals or the noise could be affected, reducing the Signal-to-Noise ratio or SNR and therefore the bitrate that could be allocated for communication. It is therefore important for the service providers to be able to detect and recognize these impairments, also from the noise. Algorithms have been designed in order to detect some specific impairments patterns from the noise affecting a communication line. These algorithms rely on features that have been empirically designed according to best practice rules and existing expert knowledge.

There are several drawbacks to this approach. The first major one is the independence of each algorithm, leading to inaccurate diagnosis of line impairments and excessive amount of false positive. Even more problematic, the presence with high confidence of concurrent/opposite diagnosis, finally preventing the network operator from taking any practical action. Secondly, as these algorithms have been designed only from a few specific cases, their ability to generalize to any medium, such as any topology, any cable gauge, any insulator, any background noise, any power-back off configuration, etc., is limited. The patterns tracked by the presently known algorithms are by definition specific to the cases under study, and therefore not generic enough to cover any situation. The presently known prior art algorithms have few quantification capabilities or quantification that present high inaccuracies.

It is thus an object of embodiments of the present invention to propose a method and a system, which do not show the inherent shortcomings of the prior art.

The scope of protection sought for various embodiments of the invention is set out by the independent claims.

The embodiments and features described in this specification that do not fall within the scope of the independent claims, if any, are to be interpreted as examples useful for understanding various embodiments of the invention.

There is a need for reliably and accurately diagnosing line impairments affecting a communication line from noise sequences.

Amongst others, it is an object of embodiments of the invention to diagnose these noise sequences by detecting, recognizing, separating and quantifying noise sources affecting a communication line.

This object is achieved, according to a first example aspect of the present disclosure, by a system for diagnosing noise impacting impairments affecting a Digital Subscriber Line, wherein the system comprises:
  a receiving unit configured to receive noise sequences for the Digital Subscriber Line; and
  a diagnosing unit comprising a trained machine learning model, wherein the diagnosing unit is configured to:
    detect noise symptoms in the noise sequences and identify noise impacting impairments associated with the noise symptoms; and
    determine an impact on the Digital Subscriber Line of a plurality of noise impacting impairments.

A noise impacting impairment according to the present disclosure is a source of noise for the Digital Subscriber Line. A noise symptom according to the present disclosure is the manifestation of a noise impacting impairment which is visible on a noise sequence. In other words, a noise sequence comprises none or one or a plurality of noise symptoms, wherein each noise symptom is a detectable characteristic which can be tracked on the noise sequence. For example, a noise symptom is repetitive peaks in a noise sequence, and the peaks may be mapped to the presence of an impacting power supply unit. According to the present disclosure, an impact on the Digital Subscriber Line of a noise impacting impairment is the measurable influence of the noise impacting impairment on the performance of the Digital Subscriber Line. In other words, the impact of a noise impacting impairment can be linked to the performance of the Digital Subscriber Line under study or alternatively, the impact of a noise impacting impairment can be linked to the performance of a predicted corresponding repaired line. For example, an impact is a bitrate loss or a signal-to-noise ratio loss or a continuous severy value comprised between 0 and 1 or a binary value, wherein 0 is indicative for the absence of a noise impacting impairment and 1 is indicative for the presence of a noise impacting impairment. The machine learning model of the diagnosing unit is specifically designed, trained and fed to detect, recognize, separate and quantify the impacts of noise sources of the performance of a Digital Subscriber Line.

Nowadays, for various advantageous reasons, Machine/Deep Learning solutions are preferred to provide complete and accurate diagnosis. With the present invention, we propose a system to diagnose impairments affecting the noise of a communication line leveraging deep learning. Significant bitrate capacity may be lost due to noise impairments and, by processing the noise, more complete insights can also be derived about the transmission medium such as a communication line, for example a Digital Subscriber Line, leading ultimately to more complete and more accurate recommendations, e.g. about localization of impairments, for network operators than would be generated from only a channel frequency response diagnosis.

By adopting a Machine Learning approach and by jointly processing a plurality of noise impacting impairments, conflicting diagnostics can be avoided and impacts from various noise impacting impairments can be separated and individually quantified. The purpose of the system according to a first example aspect of the invention is to diagnose noise sequences by detecting, recognizing, separating and quantifying the impacts of noise sources of the performance of a Digital Subscriber Line using neural networks specifically designed, trained and fed for this purpose. In other words, the purpose of the system according to a first example aspect of the invention is to detect, identify, distinguish and quantify different noise impacting impairments associated to noise symptoms detected on a noise sequence, or in other words, each independent impact visible on a noise sequence for any type of medium, environment and configuration characteristics. The system according to a first example aspect of the invention is able to optimally compute and extract the most optimal symptoms to determine and quantify the impacts of the noise impacting impairments. The system according to a first example aspect of the invention performs the most accurate separation and classification or regression of the known noise sources based on the most optimal symptoms. The system according to a first example aspect of the invention performs the classification or regression as a whole and not independently in order to avoid conflicting diagnosis. The system according to a first example aspect of the invention is robust to various known effects such as for example cable type, length, gauge, insulation, background noise strength, power-back off policies, etc. The diagnosing unit is also robust as it is not sensitive to minor changes affecting the noise sequences, and its accuracy in the recognition/separation of the different noise symptoms as well as on the quantification of their respective impacts is high.

According to example embodiments, the trained machine learning model comprises a convolutional neural network.

To combine all the expected requirements, as well as to increase the capability and the accuracy of the system according to a first example aspect of the invention, a deep learning approach using Convolutional Neural Network or CNN is proposed. Rationale behind this is its their great ability to process sequences, i.e. signals, curves, image, etc., and to learn how to compute and extract features that are relevant in these noise sequences in order to detect, recognize, separate and optimally quantify the different outputted insights. For that purpose, a suitable training data set, i.e. a large, various, unbiased, etc. training data set, for example consisting of upstream/downstream QLN noise sequences, has been used in order to train the CNN model of the diagnosing unit. The training data set comprises noise sequences and associated labels describing the impacts. Such a training set may be obtained by a generative approach: a noise sequence comprising a noise symptom for a single noise impacting impairment and the corresponding impact is determined, e.g. by simulation. Then, various noise sequences comprising a plurality of noise symptoms may be generated by combining such "single symptom" noise sequence, and the impacts of the respective noise impacting impairments are determined based on the combination of the single impacts. Classical training and optimization techniques such as adaptive momentum gradient descent, batch backpropagation, genetical hyperparameters tuning, early stopping, etc., have been involved, at the end leading to a suitably trained machine learning model.

According to example embodiments, an impact on the Digital Subscriber Line of a noise impacting impairment comprises one or more of the following:
  a bitrate loss;
  a signal-to-noise ratio loss;
  a continuous severy value;
  a binary indicative for presence or absence of said noise impacting impairment.

An impact on the Digital Subscriber Line of a noise impacting impairment is quantified with respect to a reference characterization of the Digital Subscriber Line. In other words, an impact on the Digital Subscriber Line of a noise impacting impairment is representative for a degradation of the performance of the Digital Subscriber Line comprising the noise impacting impairment compared with the reference performance of the Digital Subscriber Line demonstrating the reference characterization. For example, the reference characterization of a Digital Subscriber Line comprises the current line topology of the Digital Subscriber Line. Alternatively, the reference characterization of a Digital Subscriber Line comprises a prediction of a corresponding repaired Digital Subscriber Line. Alternatively, the reference characterization of a Digital Subscriber Line is the visible or the potential performance of the Digital Subscriber Line.

According to example embodiments, the noise sequences are sequences of quiet line noise.

24 Quiet-Line-Noise estimates the received noise over frequency during a time of no signal transmission on the line. In other words, environmental noise, commonly expressed in dB and called Quiet Line Noise or QLN in the xDSL context when the line is not in-service, comprises key measurements performed by the modems at both sides during initialization. QLN is generally represented in the form of noise sequences, wherein the noise sequences may comprise the aggregation of several impacting noise symptoms.

According to example embodiments, the noise sequences comprise an upstream noise sequence and a downstream noise sequence for the Digital Subscriber Line.

The presented convolutional neural network has been designed to use, as inputs both from a training perspective or from a prediction perspective, for example for diagnosis, two actual noise sequences, an upstream noise sequence and a downstream noise sequence respectively abbreviated to QLNus and QLNds. Inputs of the CNN model consists therefore in two noise sequences expressed in the logarithmic scale (dB) and ranging over typically 512 frequency tones or tone groups. At this stages, the upstream and downstream parts are combined, as the way to extract patterns should be from similar between the streams. These noise sequences are standardized format for QLN, and may results from an aggregation of larger QLN, depending on the technologies. For instance, in VDSL2 17 Mhz, a measured QLN of 4096 tones is aggregated by a ratio of 1:8, producing a standardized sequence of 512 tone groups. The network topology consists therefore basically of two branches, where there are alternatively convolutional stages and max pooling, moreover spread over multiple channels, as such stages get replicated with multiple filters. Today, in order to find the most suitable types of processing steps, for example the amount of filters, size, pooling ratio, etc., a domain-aware genetical approach has been implemented to progress in the research of one of the most suitable neural network topology. At the end of these convolutional branches, as the ultimate goal is to return outputs per stream, the features of the two curves applicable to a first stream, e.g. the upstream noise sequence, get selected and grouped from the features applicable to the other stream, for example the downstream noise sequence. As such, there will be two fully connected sub-networks, one to combine the features upstream and to derive the outputs related to upstream (CO noise diagnosis) and a second one to combine the features downstream and to derive the outputs related to downstream (CPE noise diagnosis). Alternatively, such network could easily be extended to return other outputs, such as for instance returning also insights about the affecting channel impairments.

According to example embodiments, the diagnosing unit is further configured to output a list of the noise impacting impairments expressed per category and per severity.

QLN sequences and optionally other pre-processed/transformed carrier data will be fed to the trained machine learning model model in order to return a list of noise impacting impairments, expressed per categories and per severity. This can be seen as a multi-class regression problem. The list of noise impacting impairments can be formalized as outputs as follows in equation (1):

$$\text{Outputs}_j = [FEXT_{US,j}, HighNoise_{US,j}, \\ RFI_{US,j}, PSU_{US,j}, RFI_{US,j}, \text{Impairments}_{US,j}, FEXT_{DS,j}, \\ HighNoise_{DS,j}, RFI_{DS,j}, PSU_{DS,j}, RFI_{DS,j}, \text{Impairments}_{DS,j}] = \\ CNN(QLN_{US}, QLN_{DS}, p(Hlog_{US}, Hlog_{DS}, TxPSD_{US}, TxPSD_{DS})) \quad (1)$$

wherein
j is the type of chosen target, for example visible/equal cabling, potential/equal cabling, visible/repaired cabling, potential/repaired cabling; and $p(H \log_{US}, H \log_{DS}, TxPSD_{US}, TxPSD_{DS})$ being optional but however preferred preprocessed carrier data derived from $H \log_{US}$, $H \log_{DS}$, $TxPSD_{US}$, $TxPSD_{DS}$ inputs.

An example of an output of the system is as such:
Outputs$_{visible/repaired\ cabling}$=[12151 kbps, 254 kbps, 1365 kbps, 6452 kbps, [1245 kbps, . . . , 21 kbps], 5245 kbps, 12 kbps, 0 kbps, 1424 kbps, [0 kbps, . . . , 1244 kbps]]

Each noise impacting impairments must be expressed for the four cases: potential repaired Digital Subscriber Line, potential equal cabling, visible repaired Digital Subscriber Line, visible equal cabling.

According to example embodiments, the noise impacting impairments comprise one or more of the following:
topological impairments;
upstream or downstream power back off;
far-end cross talk;
radio frequency interference;
power supply unit radio frequency interference;
background noise;
quantification noise;
analog-to-digital converter noise.

The noise impacting impairments will be advantageously detected, recognized, separated and quantified by the system according to the present disclosure. Noise sequences are affected by topological impairments both affecting the channel frequency response, abbreviated to H log, and the QLN, depending on the nature of the noise impacting impairments. When different technologies coexist, it is advised to make use of the upstream or downstream power back off, also referred to as respectively UPBO or DPBO. Such techniques comprise applying a shaping, over the frequencies, to the transmitted power, in order to limit the influence of signals from neighbouring lines in the measured QLN. This allows to have some fairness between lines sharing for same binders but operated in different technologies. As this ultimately affects the shape of the QLN, the patterns induced by these mechanisms need to be taken into account and/or tracked while processing the QLN. Alternatively, UPBO/DPBO could also be extended to other technologies, completing the collection of effects simulated in the noise. Far-End Cross Talk, also known as FEXT, is expressed in terms of the amount of neighbouring links that produce a significant increase of noise, according to equation (2):

$$FEXT_{loss} = 10 * \log_{10}(7.74 \cdot \\ 10^{-21} * nfext^{0.6} * line_{len} * freq^2) + H \log \quad (2)$$

wherein nfext corresponds to the amount of neighbouring links, i.e. to the number of disturbers. Radio Frequency Interference consists in isolated strong peaks visible in the noise sequence. Power Supply Unit or PSU corresponds to transforming higher DC voltage and therefore requires cutting the signal or pulse modulation at a given frequency. PSU produces electromagnetic interference. Such interferences are regularly spaced over the spectrum, at a fundamental frequency and at each of its harmonics. Such power supply units are present in modems or in various devices of the surrounding environment of the network.

According to example embodiments, the receiving unit is further configured to receive carrier data for the Digital Subscriber Line and wherein the carrier data comprises one or more of the following:
an upstream channel frequency response for the Digital Subscriber Line;
a downstream channel frequency response for the Digital Subscriber Line;
an upstream transmitted power spectral density;
a downstream transmitted power spectral density.

According to example embodiments, the diagnosing unit is further configured to quantify a signal-to-noise ratio loss induced by each of the noise impacting impairments.

According to example embodiments, the diagnosing unit is further configured to derive, from the carrier data, one or more of the following:
- an original upstream or downstream channel frequency response;
- a theoretical upstream or downstream sequence of quiet line noise of an original Digital Subscriber Line;
- a theoretical upstream or downstream sequence of quiet line noise of the Digital Subscriber Line.

An original channel frequency response corresponds to the prediction of the channel frequency response of a similar Digital Subscriber Line not impacted by noise impacting impairments. A theoretical sequence of quiet line noise of an original Digital Subscriber Line corresponds to the prediction of the theoretical noise sequence of a similar Digital Subscriber Line not being impacted by any noise impacting impairment, i.e. of a repaired Digital Subscriber Line. A theoretical sequence of quiet line noise of the Digital Subscriber Line corresponds to the prediction of the theoretical noise sequence of the Digital Subscriber Line being impacted by for instance topological impairments.

Carrier data, such as an upstream channel frequency response or Hlogus, a downstream channel frequency response or H log ds, an upstream transmitted power spectral density or TxPSDus, a downstream transmitted power spectral density or TxPSDds, will be also used to derive some scalar quantities and may also be used as inputs to the convolutional neural network of the diagnosing unit. More formally, Hlogus, H log ds, TxPSDus, TxPSDds are preferably used as complementary inputs to the upstream noise sequence and to the downstream noise sequence in order:
- to derive the "original H log US/DS", using a deep learning approach and a convolutional neural network for original H log estimation;
- to derive the "theoretical QLN US/DS" of the original line, following equations (3) and (4):

$$FEXT_{loss}=10*\log_{10}(7.74 \cdot 10^{-21}*nfext^{0.6}*line_{len}*freq^2)+H\log_{original} \quad (3)$$

$$QLN_{theoric}=Tx_{psd}+FEXT_{loss} \quad (4)$$

to derive the "theoretical QLN US/DS" of the current line, following equations (5) and (6):

$$FEXT_{loss}=10*\log_{10}(7.74 \cdot 10^{-21}*nfext^{0.6}*line_{len}*freq^2)+H\log_{actual} \quad (5)$$

$$QLN_{theoric}=Tx_{psd}+FEXT_{loss} \quad (6)$$

According to example embodiments, the diagnosing unit is further configured, for each of the noise impacting impairments, to determine at least one of the following:
- a signal-to-noise ratio loss between an ideal noise sequence for the Digital Subscriber Line not affected by any noise impacting impairment and a corresponding noise sequence affected by a noise impacting impairment;
- a signal-to-noise ratio loss between the ideal noise sequence for the Digital Subscriber Line only affected by topological impairments and the corresponding noise sequence affected by a noise impacting impairment;
- a signal-to-noise ratio loss between a noise sequence comprising an excessive contribution of the noise impacting impairment compared to other noise impacting impairments for the Digital Subscriber Line not affected by any topological impairments; and
- a signal-to-noise ratio loss between a noise sequence comprising an excessive contribution of the noise impacting impairment compared to other noise impacting impairments for the Digital Subscriber Line affected by its topological impairments.

An ideal noise sequence corresponds to the QLN expected for the same Digital Subscriber Line not affected by any topological impairment and without the presence of any impacting noise sources. An ideal noise sequence for the Digital Subscriber Line only affected by topological impairments corresponds to the QLN expected for the same Digital Subscriber Line affected by its topological impairment but without the presence of any impacting noise sources.

This way, the system not only detects and recognizes each affecting noise impacting impairment, the system further quantifies the impact of each noise impacting impairment in terms of bitrate loss or SNR loss, noise impacting impairment by noise impacting impairment in a noise sequence. These quantifications may be advantageously user to accurately label each noise sequence. For example, the system performs at least one of the following:
- estimation/prediction of a signal-to-noise ratio loss or bitrate loss between an ideal noise sequence for the Digital Subscriber Line not affected by any noise impacting impairment and a corresponding noise sequence affected by far-end cross talk;
- estimation/prediction of a signal-to-noise ratio loss or a bitrate loss between the ideal noise sequence for the Digital Subscriber Line only affected by topological impairments and the corresponding noise sequence affected by far-end cross talk;
- estimation/prediction of a signal-to-noise ratio loss or a bitrate loss between a noise sequence comprising an excessive contribution of far-end cross talk compared to other noise impacting impairments for the Digital Subscriber Line not affected by any topological impairments; and
- estimation/prediction of a signal-to-noise ratio loss or a bitrate loss between a noise sequence comprising an excessive contribution of far-end cross talk compared to other noise impacting impairments for the Digital Subscriber Line affected by its topological impairments.

For example, the system performs at least one of the following:
- estimation/prediction of a signal-to-noise ratio loss or bitrate loss between an ideal noise sequence for the Digital Subscriber Line not affected by any noise impacting impairment and a corresponding noise sequence affected by background noise;
- estimation/prediction of a signal-to-noise ratio loss or a bitrate loss between the ideal noise sequence for the Digital Subscriber Line only affected by topological impairments and the corresponding noise sequence affected by background noise;
- estimation/prediction of a signal-to-noise ratio loss or a bitrate loss between a noise sequence comprising an excessive contribution of background noise compared to other noise impacting impairments for the Digital Subscriber Line not affected by any topological impairments; and
- estimation/prediction of a signal-to-noise ratio loss or a bitrate loss between a noise sequence comprising an excessive contribution of background noise compared to other noise impacting impairments for the Digital Subscriber Line affected by its topological impairments.

For example, the system performs at least one of the following:
  estimation/prediction of a signal-to-noise ratio loss or bitrate loss between an ideal noise sequence for the Digital Subscriber Line not affected by any noise impacting impairment and a corresponding noise sequence affected by radio frequency interference;
  estimation/prediction of a signal-to-noise ratio loss or a bitrate loss between the ideal noise sequence for the Digital Subscriber Line only affected by topological impairments and the corresponding noise sequence affected by radio frequency interference;
  estimation/prediction of a signal-to-noise ratio loss or a bitrate loss between a noise sequence comprising an excessive contribution of radio frequency interference compared to other noise impacting impairments for the Digital Subscriber Line not affected by any topological impairments; and
  estimation/prediction of a signal-to-noise ratio loss or a bitrate loss between a noise sequence comprising an excessive contribution of radio frequency interference compared to other noise impacting impairments for the Digital Subscriber Line affected by its topological impairments.

For example, the system performs at least one of the following:
  estimation/prediction of a signal-to-noise ratio loss or bitrate loss between an ideal noise sequence for the Digital Subscriber Line not affected by any noise impacting impairment and a corresponding noise sequence affected by power supply unit radio frequency interference;
  estimation/prediction of a signal-to-noise ratio loss or a bitrate loss between the ideal noise sequence for the Digital Subscriber Line only affected by topological impairments and the corresponding noise sequence affected by power supply unit radio frequency interference;
  estimation/prediction of a signal-to-noise ratio loss or a bitrate loss between a noise sequence comprising an excessive contribution of power supply unit radio frequency interference compared to other noise impacting impairments for the Digital Subscriber Line not affected by any topological impairments; and
  estimation/prediction of a signal-to-noise ratio loss or a bitrate loss between a noise sequence comprising an excessive contribution of power supply unit radio frequency interference compared to other noise impacting impairments for the Digital Subscriber Line affected by its topological impairments.

According to example embodiments, the noise sequences are sequences of active line noise.

Trough the present disclosure, Quiet Line Noise has been reported as a primer application of such system and method. Alternatively, other related curves, for instance the Active Line Noise or ALN, could be processed in a very similar way. Therefore, the system can be also trained using ALN sequences, adapting therefore to such ALN noise symptoms and noise impacting impairments. This is particularly valid in a vectoring context and vectored technologies, where a similar approach remains perfectly valid, where the FEXT level probability and ranges would simply differ. Such approach is also alternatively valid for generating G·(m)fast (106 Mhz and multiple) QLN/ALN noise sequences.

According to a second example aspect, a method is disclosed for diagnosing noise impacting impairments affecting a Digital Subscriber Line, wherein the method comprises the steps of:
  receiving noise sequences for the Digital Subscriber Line;
  relying on a trained machine learning model to:
    detect noise symptoms in the noise sequences and identify noise impacting impairments associated with the noise symptoms; and
    determine an impact on the Digital Subscriber Line of a plurality of noise impacting impairments.

Nowadays, for various advantageous reasons, Machine/Deep Learning solutions are preferred to provide complete and accurate diagnosis. With the present invention, we propose a method to diagnose impairments affecting the noise of a communication line leveraging deep learning. Significant bitrate capacity may be lost due to noise impairments and, by processing the noise, more complete insights can also be derived about the transmission medium such as a communication line, for example a Digital Subscriber Line, leading ultimately to more complete and more accurate recommendations, e.g. about localization of impairments, for network operators than would be generated from only a channel frequency response diagnosis.

By adopting a Machine Learning approach and by jointly processing a plurality of noise impacting impairments, conflicting diagnostics can be avoided and impacts from various noise impacting impairments can be separated and individually quantified. The purpose of the method according to a second example aspect of the invention is to diagnose noise sequences by detecting, recognizing, separating and quantifying the impacts of noise sources of the performance of a Digital Subscriber Line using neural networks specifically designed, trained and fed for this purpose. In other words, the purpose of the method according to a second example aspect of the invention is to detect, identify, distinguish and quantify different noise impacting impairments associated to noise symptoms detected on a noise sequence, or in other words, each independent impact visible on a noise sequence for any type of medium, environment and configuration characteristics. The method according to a second example aspect of the invention is able to optimally compute and extract the most optimal symptoms to determine and quantify the impacts of the noise impacting impairments. The method according to a second example aspect of the invention performs the most accurate separation and classification or regression of the known noise sources based on the most optimal symptoms. The method according to a second example aspect of the invention performs the classification or regression as a whole and not independently in order to avoid conflicting diagnosis. The method according to a second example aspect of the invention is robust to various known effects such as for example cable type, length, gauge, insulation, background noise strength, power-back off policies, etc. The method according to a second example aspect of the invention is also robust as it is not sensitive to minor changes affecting the noise sequences, and its accuracy in the recognition/separation of the different noise symptoms as well as on the quantification of their respective impacts is high.

According to a third example aspect, a computer program product is provided, wherein the computer program product comprises computer-executable instructions for causing a device to perform at least the following:
  receiving noise sequences for the Digital Subscriber Line;
  relying on a trained machine learning model to:

detect noise symptoms in the noise sequences and identify noise impacting impairments associated with the noise symptoms; and determine an impact on the Digital Subscriber Line of a plurality of noise impacting impairments.

According to a fourth example aspect, a computer readable storage medium is provided, wherein the computer readable storage medium comprises computer-executable instructions for performing the following steps when the program is run on a computer:

receiving noise sequences for the Digital Subscriber Line;

relying on a trained machine learning model to:

detect noise symptoms in the noise sequences and identify noise impacting impairments associated with the noise symptoms; and determine an impact on the Digital Subscriber Line of a plurality of noise impacting impairments.

BRIEF DESCRIPTION OF THE DRAWINGS

Some example embodiments will now be described with reference to the accompanying drawings.

DETAILED DESCRIPTION OF EMBODIMENT(S)

Figure 1:
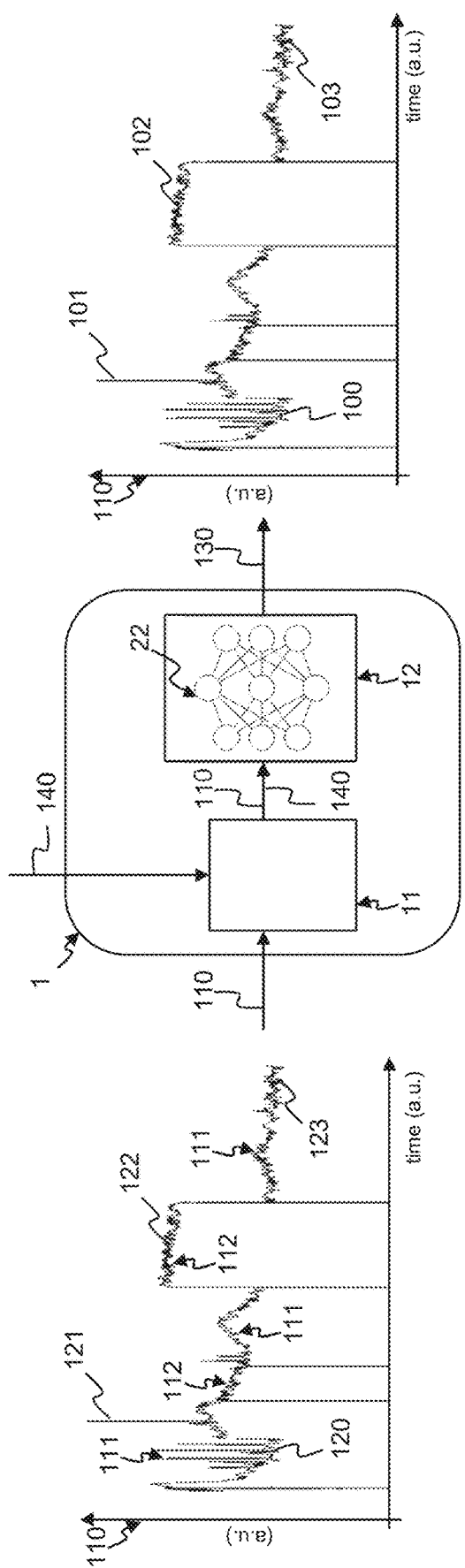
FIG. 1 depicts an example embodiment of a system according to the present disclosure.

FIG. 1 illustrates a system 1 for diagnosing noise impacting impairments 100;101;102;103 affecting a Digital Subscriber Line according to the present disclosure. The system 1 comprises a receiving unit 11 and a diagnosing unit 12. The receiving unit 11 receives noise sequences 110 for the Digital Subscriber Line. The diagnosing unit 12 comprises a trained machine learning model 22. The trained machine learning model 22 detects noise symptoms 120;121;122;123 in the noise sequences 110 and identifies noise impacting impairments 100;101;102;103 associated with the noise symptoms 120;121;122;123. The trained machine learning model 22 further determines an impact 130 on the Digital Subscriber Line of a plurality of noise impacting impairments 100;101;102;103 that were identified from the noise symptoms 120;121;122;123. The trained machine learning model 22 preferably comprises a convolutional neural network. An impact 130 on the Digital Subscriber Line of a noise impacting impairment 100;101;102;103 comprises one or more of the following: a bitrate loss, a signal-to-noise ration loss, a continuous severy value, a binary representative for presence or absence of the noise impacting impairment 100;101;102;103. The noise sequences 110 are quiet line noise. According to an alternative embodiment, the noise sequences 110 are active line noise. The noise sequences 110 comprise an upstream noise sequence 111 and a downstream noise sequence 112 for the Digital Subscriber Line. The diagnosing unit 12 outputs a list of noise impacting impairments 100;101;102;103 expressed per category and severity. Noise impacting impairments 100;101;102;103 comprise one or more of the following: topological impairments, upstream or downstream power back off, far-end cross talk, radio frequency interference, power supply unit radio frequency interference, background noise, quantification noise, analog-to-digital converter noise. The receiving unit 11 may optionally also receive carrier data 140 for the Digital Subscriber Line. The carrier data 140 comprises one or more of the following: an upstream channel frequency response for said Digital Subscriber Line, a downstream channel frequency response for said Digital Subscriber Line, an upstream transmitted power spectral density a downstream transmitted power spectral density. The diagnosing unit 12 can derive from the carrier data 140 one or more of the following: an original upstream or downstream channel frequency response, a theoretical upstream or downstream sequence of quiet line noise of an original Digital Subscriber Line, a theoretical upstream or downstream sequence of quiet line noise of said Digital Subscriber Line. The diagnosing unit 12 quantifies a signal-to-noise ratio loss induced by each of the noise impacting impairments 100;101;102; 103. The diagnosing unit 12 determines, for each of the noise impacting impairments 100;101;102;103, to at least one of the following: a signal-to-noise ratio loss or a bitrate loss between an ideal noise sequence for the Digital Subscriber Line not affected by any noise impacting impairment and a corresponding noise sequence affected by a noise impacting impairment, a signal-to-noise ratio loss or a bitrate loss between the ideal noise sequence for the Digital Subscriber Line only affected by topological impairments and the corresponding noise sequence affected by a noise impacting impairment, a signal-to-noise ratio loss or a bitrate loss between a noise sequence comprising an excessive contribution of the noise impacting impairment compared to other noise impacting impairments for the Digital Subscriber Line not affected by any topological impairments, a signal-to-noise ratio loss or a bitrate loss between a noise sequence comprising an excessive contribution of the noise impacting impairment compared to other noise impacting impairments for the Digital Subscriber Line affected by its topological impairments.

Figure 2:
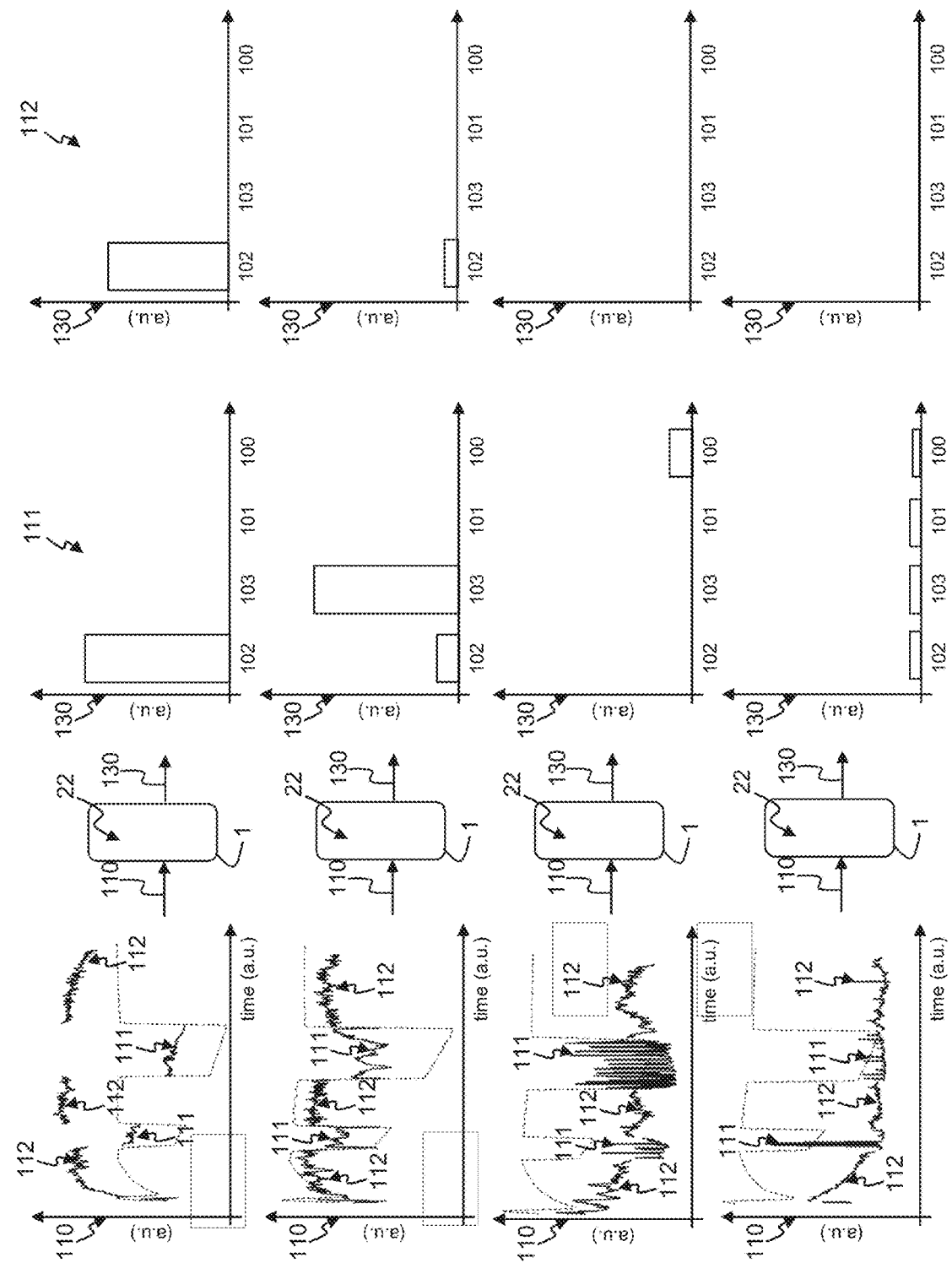
FIG. 2 shows an example embodiment of a determination of impacts of noise impacting impairments according to the present disclosure.

FIG. 2 illustrates an example embodiment of a determination of an impact 130 of noise impacting impairments 100;101;102;103 according to the present disclosure. Components having identical reference numbers than on FIG. 1 perform the same function. A system 1 for diagnosing noise impacting impairments 100;101;102;103 affecting a Digital Subscriber Line receives noise sequences 110 for the Digital Subscriber Line. The system 1 comprises a trained machine learning model 22. The trained machine learning model 22 detects noise symptoms in the noise sequences 110 and identifies noise impacting impairments 100;101;102;103 associated with the noise symptoms. The trained machine learning model 22 further determines an impact 130 on the Digital Subscriber Line of a plurality of noise impacting impairments 100;101;102;103 that were identified from the noise symptoms. The trained machine learning model 22 preferably comprises a convolutional neural network. An impact 130 on the Digital Subscriber Line of a noise impacting impairment 100;101;102;103 comprises one or more of the following: a bitrate loss, a signal-to-noise ration loss, a continuous severy value, a binary representative for presence or absence of the noise impacting impairment 100;101;102;103. The noise sequences 110 are quiet line noise. According to an alternative embodiment, the noise sequences 110 are active line noise. The noise sequences 110 comprise an upstream noise sequence 111 and a downstream noise sequence 112 for the Digital Subscriber Line. The system 1 outputs a list of noise impacting impairments 100;101;102;103 expressed per category and severity. Noise impacting impairments 100;101;102;103 comprise one or more of the following: topological impairments, upstream or downstream power back off, far-end cross talk, radio frequency interference, power supply unit radio frequency interference, background noise, quantification noise, analog-to-digital converter noise.

Figure 3:
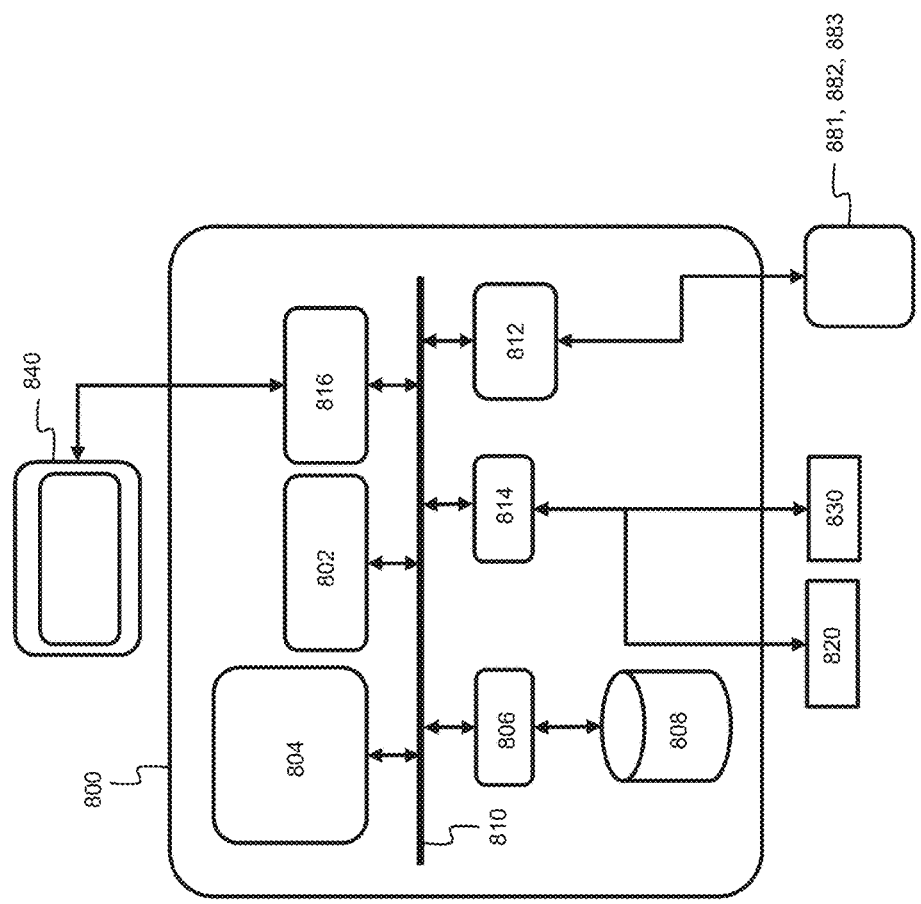
FIG. 3 shows an example embodiment of a suitable computing system for performing one or several steps in embodiments of the invention.

FIG. 3 shows a suitable computing system 800 enabling to implement embodiments of the system. Computing system 800 may in general be formed as a suitable general-purpose computer and comprise a bus 810, a processor 802, a local memory 804, one or more optional input interfaces 814, one or more optional output interfaces 816, a communication interface 812, a storage element interface 806, and one or more storage elements 808. Bus 810 may comprise one or more conductors that permit communication among the components of the computing system 800. Processor 802 may include any type of conventional processor or microprocessor that interprets and executes programming instructions. Local memory 804 may include a random-access memory (RAM) or another type of dynamic storage device that stores information and instructions for execution by processor 802 and/or a read only memory (ROM) or another type of static storage device that stores static information and instructions for use by processor 802. Input interface 814 may comprise one or more conventional mechanisms that permit an operator or user to input information to the computing device 800, such as a keyboard 820, a mouse 830, a pen, voice recognition and/or biometric mechanisms, a camera, etc. Output interface 816 may comprise one or more conventional mechanisms that output information to the operator or user, such as a display 840, etc. Communication interface 812 may comprise any transceiver-like mechanism such as for example one or more Ethernet interfaces that enables computing system 800 to communicate with other devices and/or systems, for example with other computing devices 881, 882, 883. The communication interface 812 of computing system 800 may be connected to such another computing system by means of a local area network (LAN) or a wide area network (WAN) such as for example the internet. Storage element interface 806 may comprise a storage interface such as for example a Serial Advanced Technology Attachment (SATA) interface or a Small Computer System Interface (SCSI) for connecting bus 810 to one or more storage elements 808, such as one or more local disks, for example SATA disk drives, and control the reading and writing of data to and/or from these storage elements 808. Although the storage element(s) 808 above is/are described as a local disk, in general any other suitable computer-readable media such as a removable magnetic disk, optical storage media such as a CD or DVD, -ROM disk, solid state drives, flash memory cards, . . . could be used. Computing system 800 could thus correspond to the system in the embodiment illustrated by FIG. 1.

As used in this application, the term "circuitry" may refer to one or more or all of the following:
(a) hardware-only circuit implementations such as implementations in only analog and/or digital circuitry and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and/or processor(s), such as microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:
1. A system for diagnosing noise impacting impairments affecting a Digital Subscriber Line, wherein said system comprises:
  at least one processor; and
  at least one memory storing instructions;
  the at least one memory and the instructions configured to, with the at least one processor, cause the system at least to:
  receive noise sequences for said Digital Subscriber Line;
  receive a carrier data for said Digital Subscriber Line, the carrier data including an upstream channel frequency response for said Digital Subscriber Line and a downstream channel frequency response for said Digital Subscriber Line;
  detect noise symptoms in said noise sequences and identify noise impacting impairments associated with said noise symptoms using a trained machine learning model; and
  determine an impact on said Digital Subscriber Line of a plurality of noise impacting impairments, wherein the trained machine learning model is configured to determine the impact on said Digital Subscriber Line based on the received noise sequences and the received carrier data.

2. The system according to claim 1, wherein said trained machine learning model comprises a convolutional neural network.

3. The system according to claim 1, wherein an impact on said Digital Subscriber Line of a noise impacting impairment comprises one or more of the following:
   a bitrate loss;
   a signal-to-noise ratio loss;
   a continuous severy value; or
   a binary indicative for presence or absence of said noise impacting impairment.

4. The system according to claim 1, wherein said noise sequences are sequences of quiet line noise.

5. The system according claim 1, wherein said noise sequences are sequences of active line noise.

6. The system according to claim 1, wherein said noise sequences comprise an upstream noise sequence and a downstream noise sequence for said Digital Subscriber Line.

7. The system according to claim 6, wherein the at least one memory and the instructions are configured to, with the at least one processor, cause the system at least to output a list of said noise impacting impairments expressed per category and per severity.

8. The system according to claim 1, wherein said noise impacting impairments comprise one or more of the following:
   topological impairments;
   upstream or downstream power back off;
   far-end cross talk;
   radio frequency interference;
   power supply unit radio frequency interference;
   background noise;
   quantification noise; or
   analog-to-digital converter noise.

9. The system according to claim 1, wherein said carrier data further comprises one or more of the following,
   an upstream transmitted power spectral density; or
   a downstream transmitted power spectral density.

10. The system according to claim 9, wherein the at least one memory and the instructions are configured to, with the at least one processor, cause the system at least to derive, from said carrier data, one or more of the following:
    an original upstream or downstream channel frequency response;
    a theoretical upstream or downstream sequence of quiet line noise of an original Digital Subscriber Line;
    a theoretical upstream or downstream sequence of quiet line noise of said Digital Subscriber Line.

11. The system according to claim 1, wherein the at least one memory and the instructions are configured to, with the at least one processor, cause the system at least to quantify a signal-to-noise ratio loss induced by each of said noise impacting impairments.

12. The system according to claim 11, wherein the at least one memory and the instructions are configured to, with the at least one processor, cause the system, for each of said noise impacting impairments, to determine at least one of the following,
    a signal-to-noise ratio loss or a bitrate loss between an ideal noise sequence for said Digital Subscriber Line not affected by any noise impacting impairment and a corresponding noise sequence affected by a noise impacting impairment;
    a signal-to-noise ratio loss or a bitrate loss between said ideal noise sequence for said Digital Subscriber Line only affected by topological impairments and said corresponding noise sequence affected by a noise impacting impairment;
    a signal-to-noise ratio loss or a bitrate loss between a noise sequence comprising an excessive contribution of said noise impacting impairment compared to other noise impacting impairments for said Digital Subscriber Line not affected by any topological impairments; and
    a signal-to-noise ratio loss or a bitrate loss between a noise sequence comprising an excessive contribution of said noise impacting impairment compared to other noise impacting impairments for said Digital Subscriber Line affected by its topological impairments.

13. A method for diagnosing noise impacting impairments affecting a Digital Subscriber Line, wherein said method comprises:
    receiving noise sequences for said Digital Subscriber Line;
    receive a carrier data for said Digital Subscriber Line, the carrier data including an upstream channel frequency response for said Digital Subscriber Line and a downstream channel frequency response for said Digital Subscriber Line;
    relying on a trained machine learning model to:
        detect noise symptoms in said noise sequences and identify noise impacting impairments associated with said noise symptoms; and
        determine an impact on said Digital Subscriber Line of a plurality of noise impacting impairments,
    wherein the determining the impact on said Digital Subscriber Line is based on the received noise sequences for said Digital Subscriber Line and the received carrier data for said Digital Subscriber Line.

14. A non-transitory computer readable storage medium storing instructions, which when executed by a processor of a system cause the system to:
    receiving noise sequences for a Digital Subscriber Line;
    receiving a carrier data for said Digital Subscriber Line, the carrier data including an upstream channel frequency response for said Digital Subscriber Line and a downstream channel frequency response for said Digital Subscriber Line;
    relying on a trained machine learning model to:
        detect noise symptoms in said noise sequences and identify noise impacting impairments associated with said noise symptoms; and
        determine an impact on said Digital Subscriber Line of a plurality of noise impacting impairments,
    wherein the determining the impact on said Digital Subscriber Line is based on the received noise sequences for said Digital Subscriber Line and the received carrier data for said Digital Subscriber Line.

* * * * *